United States Patent [19]

Zachrei et al.

[11] Patent Number: 4,908,733
[45] Date of Patent: Mar. 13, 1990

[54] SWITCH BOX FOR WALL ATTACHMENT

[75] Inventors: Jurgen Zachrei, Dillenburg-Nanzenbach; Jurgen Debus, Dietzholztal, both of Fed. Rep. of Germany

[73] Assignee: Rittal-Werk Rudolf Loh GmbH & Co. KG, Fed. Rep. of Germany

[21] Appl. No.: 340,211

[22] Filed: Apr. 19, 1989

[30] Foreign Application Priority Data

Apr. 19, 1988 [DE] Fed. Rep. of Germany ....... 3812941

[51] Int. Cl.4 ............................................... H02B 1/08
[52] U.S. Cl. ..................................... 361/356; 220/3.3; 361/362
[58] Field of Search ...................... 174/57, 58; 220/3.2, 220/3.3, 3.7, 3.9; 361/356–362, 427, 429

[56] References Cited

U.S. PATENT DOCUMENTS 640,482   1/1900   Murphy ............................ 361/356
929,812   8/1909   Adam ............................... 361/362
3,564,112 2/1971   Algotsson et al. ................ 361/356

FOREIGN PATENT DOCUMENTS 7902216  6/1979  Fed. Rep. of Germany .
785896  11/1957  United Kingdom ................. 220/3.3

Primary Examiner—Greogry D. Thompson
Attorney, Agent, or Firm—Thomas W. Speckman; Douglas H. Pauley

[57] ABSTRACT

A switch box for wall attachment with a box-like cabinet body having a rear wall and four side walls, the open side of which body can be closed by a cabinet cover or a cabinet door. Using thin starting materials for the cabinet body, an increase of stability, in addition to the possibility of further attachment locations, can be attained by attaching a mounting angle in each of four corner areas on the internal side of the rear wall. The legs of the mounting angle, provided with threaded mounts, are positioned in a plane parallel to the rear wall and spaced at a distance therefrom. At least one external longitudinal side of a leg is provided with a recess for fixing a support strip which is firmly screwed in the area of the open side of the cabinet body. At least one threaded mount of every mounting angle is accessible by a boring in the rear wall of the cabinet body.

19 Claims, 2 Drawing Sheets

SWITCH BOX FOR WALL ATTACHMENT

BACKGROUND OF THE INVENTION

1. Field of the Invention

This invention relates to a switch box for wall attachment having a box-like cabinet body, comprising a rear wall and four side walls, the open side of which body can be closed by means of a cabinet cover or a cabinet door.

2. Description of the Prior Art

In the known switch boxes for this type of application, the cabinet body is, as a rule, drawn or folded out from a section of sheet metal and then assembled. The thickness of the sheet metal used is thus, for reasons of weight and costs, kept thin. This has direct results in the stability of the cabinet body, which is a direct disadvantage for wall attachment, since the rear wall of the cabinet body must support the switch box with its components.

SUMMARY OF THE INVENTION

It is an object of the invention to create a switching box of the type stated above, in which, while still using relatively thin construction materials, a sufficient stability of the cabinet body can be attained for wall attachment whereby the additional necessary parts in addition to increasing the stability, can take over further attachment possibilities for the components.

This object is achieved, in accordance with the invention, through the fact that, in all four corner areas, on the internal side of the rear wall, a mounting angle is attached, the legs of which are provided with threaded mountings and positioned in a plane parallel to the rear wall and spaced at a distance from the rear wall with external longitudinal sides abutting against the side walls. At least one leg is provided with a recess for accepting a support strip firmly screwed in the area of the open side of the cabinet body. At least one threaded mounting of every mounting angle is accessible through a hole in the rear wall.

The mounting angles thus formed and connected with the rear wall provide, with only small materials expense, an outstanding stability in the areas of the cabinet body which are used for wall attachment. On the mounting angles, a mounting plate can be fastened at a distance from the rear wall, and the support strips installed in the cabinet body are, in the area of the angles, held, without additional attachment means, solely through a recess in the external leg, so that the support strips only need to be fastened tightly in the area of the open side of the cabinet body. The support strips can have insert nuts of the type as known by which additional attachment angles or the like can be attached to the inner sides of the side walls.

The distance of the mounting angles from the rear wall can, in accordance with one embodiment, be simply maintained by the fact that the legs of the mounting angles, on their longitudinal sides and frontal sides, are provided with edgings, which abut on the internal side of the rear wall, to set the distance of the leg to the rear wall, and are at least partially connected with the rear wall, preferably being welded. The connection of the mounting angles with the rear wall is, in accordance with one embodiment, achieved in a simple manner through the fact that the frontal sides of the legs proceed with their edgings in end sections lying parallel to the plane of the legs, which sections are connected with the rear wall, preferably being welded.

In order for a mounting plate screwed to angles not to prevent access to the threaded mounts of the mounting angles, it is furthermore provided that at least one leg of the mounting angle is provided with a support stamping for a mounting plate, which projects on the side of the leg turned away from the rear wall, and that the mounting plate is provided, in the area of the threaded mounts, with recesses or bevel.

In accordance with one preferred embodiment, it is provided that the support stampings for the mounting plate are positioned on one leg, and the recess for the support strip on the other leg of the mounting angle in the area of the external longitudinal side.

In order that the support strips on the internal sides can be attached to opposing side walls, one embodiment provides that two types of mounting angles with interchanged legs are used, whereby two identical mounting angles are each attached in the corner areas positioned diagonally.

If it is provided that a threaded mount of the mounting angle is positioned on the diagonals of the legs, then this threaded mount is accessible through a boring in the rear wall, and can be used to hold wall attachment angles to the external side of the rear wall. The wall attachment angles can then be connected to the rear wall in two positions rotated by 90°, and protrude as desired against one or the other lateral wall of the corner area of the cabinet body.

The screwing of the support strips to the cabinet body is, in accordance with one embodiment achieved in such a manner that the open side of the cabinet body is provided with a closing edge and a closing bar. The upper ends of the support strips accommodate insert nuts with frontal-side threaded mount and attachment screws through holes in the closing edge of the cabinet body are screwed into the frontal side threaded mounts of the insert nuts. If the cabinet body is closed with the cabinet cover articulated therewith, then attachment screws are used in addition to provide attachment of the hinge parts to the closing edge of the cabinet body.

A simple application of wall attachment angles to the rear wall results, in accordance with one embodiment, by Z-form wall attachment angles which can be screwed from the outside onto the rear wall, whereby at least one attachment screw is screwed through a hole of the rear wall into a threaded mount of the mounting angle. The central leg of the wall attachment angle extends and abuts on the external side of a side wall and the wall attachment angle is firmly attached in a non-rotatable manner.

BRIEF DESCRIPTION OF THE DRAWING

The invention will now be illustrated in further detail by means of examples of execution depicted in the drawings wherein.

DESCRIPTION OF PREFERRED EMBODIMENTS

Figure 1:
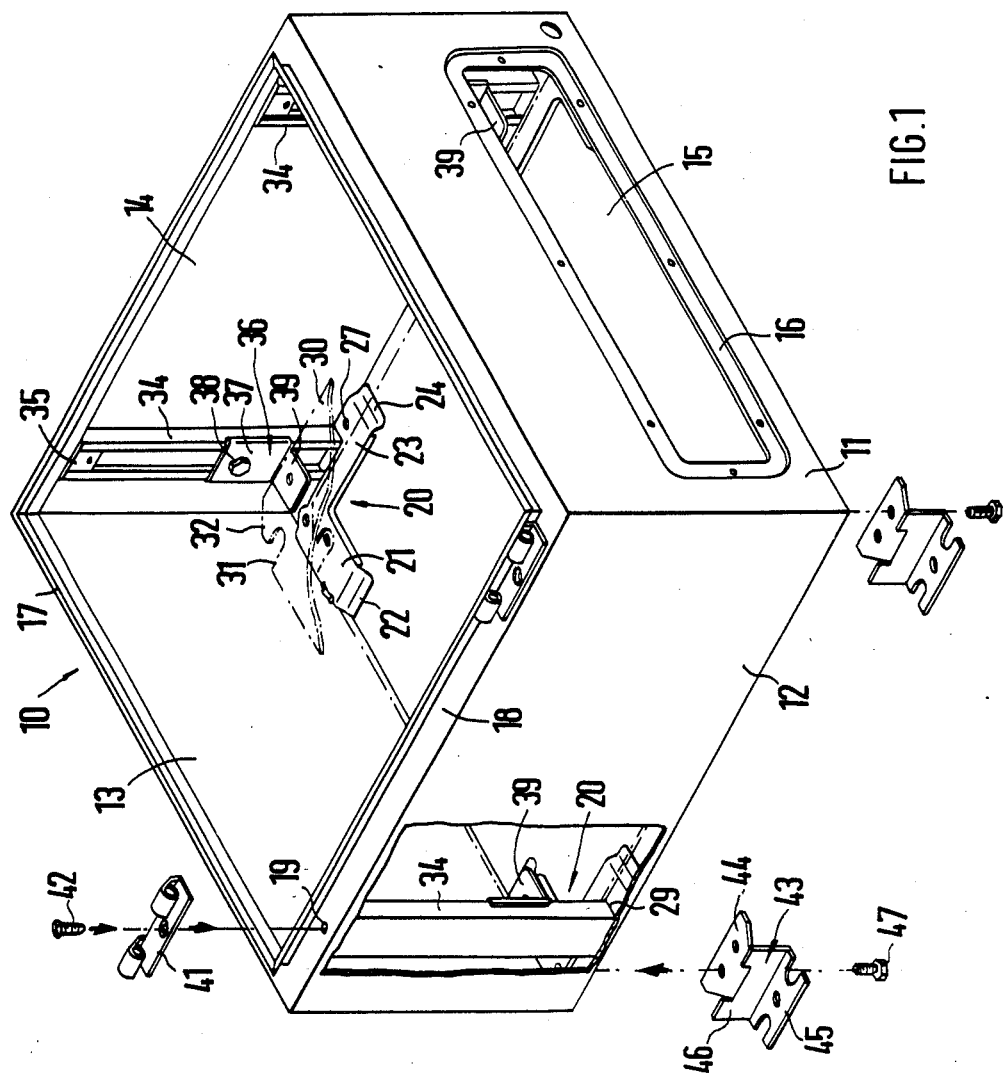
FIG. 1 is a perspective view of the cabinet body of a switching box for a wall attachment.

The box-like cabinet body (10) of the example of execution shown in the figures has an approximately square cross-section, as FIG. 1 shows, and comprises four side walls (11, 12, 13 and 14), as well as the rear wall (15). Insert opening (16), which serves for the insertion of cables and can be closed by means of cable inserts or the like of known types are located in side wall (11). In the area of the open side of the cabinet body (10), the side walls (11 to 14) are bordered at a right angle toward the interior to form the surrounding closing edge (18), which proceeds generally perpendicularly to the outwardly projecting, surrounding closing bar (17). Borings (19) and/or threaded mounts can be applied in closing edge (18), so that, for example, a cabinet cover can be screwed onto closing edge (18). Closing bar (17) can thereby act in unison with a sealing element on the cabinet cover, in order to attain a tight sealing of the cabinet body (10). Hinge parts (41), to which a cabinet door can be articulated, can also be attached to the closing edge (18), as will be shown further hereinunder.

Figure 2:
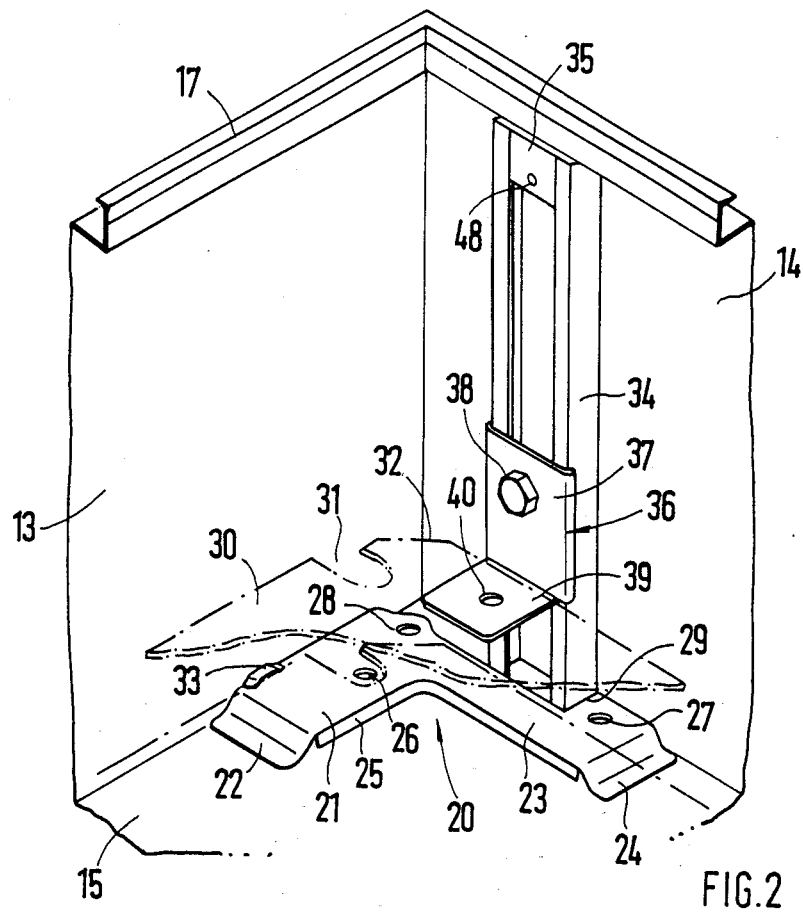
FIG. 2 is an enlarged perspective partial view of one corner interior area of the cabinet body shown in FIG. 1.

In the four corner areas of cabinet body (10), mounting angles (20) are attached to the internal side of rear wall (15), which provides a significant increase in the stability of the cabinet body (10) directly in those areas of the rear wall (15) used for wall attachment. Both legs (21 and 23) of the mounting angles (20) lie in a plane which lies parallel to and spaced from rear wall (15). This distance is maintained small through the fact that legs (21 and 23) are provided, on their longitudinal sides, with edgings (25), which abut on rear wall (15). The frontal sides of legs (21 and 23) are likewise provided with edgings (22 and 24), which proceed into end sections, which are directed parallel to rear wall (15) and connected with the same, preferably by means of welding. Legs (21 and 23) of mounting angles (20) have threaded mounts (26, 27 and 28), respectively, whereby the threaded mount (28) lies on the diagonal of mounting angle (20). Leg (21) of mounting angle (20), which is attached in the corner area with side walls (13 and 14) has, on the external leg longitudinal side, support stamping (33) for mounting plate (30), which projects from leg (21) on the side away from rear wall (15). Leg (23) has, on the external leg longitudinal side, a recess (29), which tightly holds the support strip (34), which extends from the rear wall (15) up to the closing edge (18). Through this means, the lower end of support strip (34) is held by recess (29) and only the upper end adjacent closing edge (18) needs to be fastened to cabinet body (10). Insert nuts (35) are inserted into support strips (34) and have threaded hole (48) accessible from the internal space of the cabinet body (10) and also the frontal side which is turned toward closing edge (18) is provided with a threaded hole into which attachment screw (42) may be inserted through boring (19) and screwed into. Insert nut (35) inserted into the support strip (34) is, after insertion, still longitudinally adjustable in support strip (34), but not, however, detachable laterally from the support strip. By means of a similar insert nut (35) on support strip (34), attachment angle (36) can also be attached by its leg (37), as the attachment screw (38) in FIG. 2 indicates. Leg (39) of attachment angle (36) projecting into the internal space of cabinet body (10) can also be used for the attachment of components, such as, for example, a mounting plate (30), which maintains a greater distance to the rear wall (15). A hole (40) which is located in leg (39), may be used to attach components to the internal space of cabinet body (10). Mounting plate (30) is provided with recesses (31) and/or bevels (32), which make possible access to the threaded mounts (26, 27 and 28) of mounting angle (20).

In addition, by means of attachment screws (42), hinge parts (41), with which the hinge parts connected with the cabinet door are articulated, can be connected with closing edge (18) of cabinet body (10).

Just as is the case in the corner area with the side walls (13 and 14), in the corner area with the side walls (11 and 12) in identical mounting angle (20) is also attached. In both corner areas with the side walls (12 and 13, and 14 and 11), mounting angles (20) are used, in which the legs (21 and 23) are interchanged, in order that both pairs of support strips (34) can be attached to the internal sides of both side walls (12 and 14) positioned opposite to one another.

Rear wall (15) is provided, in the area of the threaded mount (28) lying on the diagonal, with a hole, through which attachment screw (47) can be inserted, and can be screwed into threaded mount (28). The Z-shaped wall attachment angle (43) is connected with rear wall (15) by means of attachment screw (47). Through this means, attachment screw (47) is conducted through a hole in leg (44). Extensions of central leg (46) are thereby abutted against the external side of the side wall, while the leg (45) protrudes away from cabinet body (10), and is used for wall attachment. Wall attachment angles (43) can thereby be connected, in two positions rotated by 90°, in a non-rotatable manner with the rear wall (15), so that legs (45) of the two wall attachment angles (43) depicted in FIG. 1, both project away from side wall (12) or one leg (45) of one wall attachment angle (43) may project away from side wall (13). For this reason, legs (44) of wall attachment angles (43) bear two borings at corresponding distances.

We claim:

1. A switch box for wall attachment having a box-like cabinet body comprising a rear wall and four side walls forming an open side which can be closed by cabinet cover means, said switch box comprising:

a mounting angle (20) attached in each of four corner areas on an internal side of a rear wall (15), said mounting angle (20) having a first leg (21) and a second leg (23), said first leg (21) having a first threaded mounting (26), said second leg (23) having a second threaded mounting (27), and a third threaded mounting (28) positioned in an adjoining area of said first leg (21) and said second leg (23), said first leg (21) and said second leg (23) positioned in a plane parallel to said rear wall (15) and spaced at a distance from said rear wall (15), said first leg (21) and said second leg (23) each having an external edging (25) abutting a corresponding side wall of said side walls (11, 12, 13, 14) which meet forming said corner area (11, 12; 12, 13; 13, 14; 14, 11);

an external leg longitudinal edge of at least one of said first leg (21) and said second leg (23) having a recess (29) for accepting a support strip (34) which is secured in an area of said open side of said cabinet body (10);

and at least one of said first threaded mounting (26), said second threaded mounting (27) and said third threaded mounting (28) being accessible through a hole in said rear wall (15).

2. A switch box in accordance with claim 1 wherein said external projecting edging (25) form said external leg longitudinal edge and an internal edging (25) projecting from an internal leg longitudinal edge abut said rear wall (15) and a frontal edging (22, 24) on frontal sides of said first leg (21) and said second leg (23) are connected to said rear wall (15), thereby determining said distance of said first leg (21) and said second leg (23) from said rear wall (15).

3. A switch box in accordance with claim 2 wherein each of said frontal sides proceeds with said frontal edging (22, 24) into an end section lying parallel with a plane defined by said first leg (21) and said second leg (23), and said frontal edging (22, 24) is welded to said rear wall (15).

4. A switch box in accordance with claim 3 wherein at least one of said first leg (21) and said second leg (23) of said mounting plate (20) has a support stamping (33) which projects from a top side of said at least one of said first leg (21) and said second leg (23) facing away from said rear wall (15), and a mounting plate (30) is supported by said support stamping (33) above said mounting angle (20); and said mounting plate (30) has at least one of a recess (31) and a bevel (32) near at least one of said first threaded mounting (26), said second threaded mounting (27) and said third threaded mounting (28).

5. A switch box in accordance with claim 4 wherein said support stamping (33) for said mounting plate (30) is on said first leg (21), and said recess (29) for said support strip (34) is on said second leg (23) and said support stamping (33) and said recess (29) are respectively positioned near said external leg longitudinal edge of each said first leg (21) and said second leg (23).

6. A switch box in accordance with claim 4 wherein said mounting angles (20) are of a first type having said support stamping (33) on said first leg (21) and said recess (29) on said second leg (23) and are of a second type having said support stamping (33) on said second leg (23) and said recess (29) on said first leg (21) whereby identical said mounting angles (20) are attached in opposite corner areas along a diagonal of said rear wall (15).

7. A switch box in accordance with claim 6 wherein said third threaded mounting (28) of said mounting angle (20) is positioned on said diagonal.

8. A switch box in accordance with claim 7 wherein said open side of said cabinet body (10) has a surrounding closing edge (18) and a closing bar (17);
    an end of said support strip (34) toward said open side accommodates an insert nut (35) having a frontal side threaded mount; and
    said closing edge (18) of said cabinet body (10) has through holes (19) and a first attachment screw (42) that passes through each of said through holes (19) and is engaged with a corresponding threaded hold within said insert nut (35).

9. A switch box in accordance with claim 8 wherein said first attachment screw (42) is used for attachment of hinge parts (41) on said closing edge (18) of said cabinet body (10).

10. A switch box in accordance with claim 9 further comprising a plurality of Z-shaped wall attachment angles (43) each attached to an exterior rear wall surface of said rear wall (15) by at least one second attachment screw (47) passing through a hinge hole in a hinge leg (44) of each of said Z-shaped wall attachment angles and through a boring in said rear wall (15) and engageable with one of said first threaded mounting (26), said second threaded mounting (27) and said third threaded mounting (28); a central leg (46) of each of said Z-shaped wall attachment angles (43) abutting an exterior sidewall surface of one of said side walls (11, 12, 13, 14) and said central leg (46) securing each of said Z-shaped wall attachment angles (43).

11. A switch box in accordance with claim 1 wherein at least one said first leg (21) and said second leg (23) of said mounting plate (20) has a support stamping (33) which projects from a top side of said at least one of said first leg (21) and said second leg (23) facing away from said rear wall (15), and a mounting plate (30) is supported by said support stamping (33) above said mounting angle (20); and said mounting plate (30) has at least one of a recess (31) and a bevel (32) near at least one of said first threaded mounting (26), said second threaded mounting (27) and said third threaded mounting (28).

12. A switch box in accordance with claim 11 wherein said support stamping (33) for said mounting plate (30) is on said first leg (21), and said recess (29) for said support strip (34) is on said second leg (23) and said support stamping (33) and said recess (29) are respectively positioned near said external leg longitudinal edge of each said first leg (21) and said second leg (23).

13. A switch box in accordance with claim 11 wherein said mounting angles (20) are of a first type having said support stamping (33) on said first leg (21) and said recess (29) on said second leg (23) and are of a second type having said support stamping (33) on said second leg (23) and said recess (29) on said first leg (21) whereby identical said mounting angles (20) are attached in opposite corner areas along a diagonal of said rear wall (15).

14. A switch box in accordance with claim 1 wherein said third threaded mounting (28) of said mounting angle (20) is positioned on a diagonal where said first leg (21) and said second leg (23) adjoin.

15. A switch box in accordance with claim 1 wherein said open side of said cabinet body (10) has a surrounding closing edge (18) and a closing bar (17);
    an end of said support strip (34) toward said open side accommodates an insert nut (35) having a frontal side threaded mount; and
    said closing edge (18) of said cabinet body (10) has through holes (19) and a first attachment screw (42) that passes through each of said through holes (19) and is engaged with a corresponding threaded hole within said insert nut (35).

16. A switch box in accordance with claim 15 wherein said first attachment screw (42) is used for attachment of hinge parts (41) on said closing edge (18) of said cabinet body (10).

17. A switch box in accordance with claim 1 further comprising a plurality of Z-shaped wall attachment angles (43) each attached to an exterior rear wall surface of said rear wall (15) by at least one attachment screw (47) passing through a hinge hole in a hinge leg (44) of each of said Z-shaped wall attachment angles and through a boring in said rear wall (15) and engageable with one of said first threaded mounting (26), said second threaded mounting (27) and said third threaded mounting (28); a central leg (46) of each of said Z-shaped wall attachment angles (43) abutting an exterior side wall surface of one of said side walls (11, 12, 13, 14 and said central leg (46) securing each of said Z-shaped wall attachment angles (43).

18. A switch box in accordance with claim 2 further comprising a plurality of Z-shaped wall attachment angles (43) each attached to an exterior rear wall surface of said rear wall (15) by at least one attachment screw (47) passing through a hinge hole in a hinge leg (44) of each of said Z-shaped wall attachment angles and through a boring in said rear wall (15) and engageable with one of said first threaded mounting (26), said second threaded mounting (27) and said third threaded mounting (28); a central leg (46) of each of said Z-shaped wall attachment angles (43) abutting an exterior side wall surface of one of said side walls (11, 12, 13, 14) and said central leg (46) securing each of said Z-shaped wall attachment angles (43).

19. A switch box in accordance with claim 11 further comprising a plurality of Z-shaped wall attachment angles (43) each attached to an exterior rear wall surface of said rear wall (15) by at least one attachment screw (47) passing through a hinge hole in a hinge leg (44) of each of said Z-shaped wall attachment angles and through a boring in said rear wall (15) and engageable with one of said first threaded mounting (26), said second threaded mounting (27) and said third threaded mounting (28); a central leg (46) of each of said Z-shaped wall attachment angles (43) abutting an exterior side wall surface of one of said side walls (11, 12, 13, 14) and said central leg (46) securing non-rotatably secure each of said Z-shaped wall attachment angles (43).

* * * * *